United States Patent
Samuels et al.

(10) Patent No.: US 9,282,226 B2
(45) Date of Patent: Mar. 8, 2016

(54) CAMERA HOUSING FOR A SQUARE-PROFILE CAMERA

(71) Applicant: GoPro, Inc., San Mateo, CA (US)

(72) Inventors: Rudy Lucas Samuels, Mill Valley, CA (US); Evan L. Coons, San Mateo, CA (US); Joshua P. Davies, Fremont, CA (US); William H. Tolbert, San Mateo, CA (US); Nicholas Streets, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/536,683

(22) Filed: Nov. 10, 2014

(65) Prior Publication Data

US 2015/0195436 A1    Jul. 9, 2015

Related U.S. Application Data

(63) Continuation of application No. 14/148,536, filed on Jan. 6, 2014.

(51) Int. Cl.
| | |
|---|---|
| *G03B 17/08* | (2006.01) |
| *G03B 17/02* | (2006.01) |
| *H04N 5/225* | (2006.01) |
| *H04N 5/232* | (2006.01) |

(52) U.S. Cl.
CPC .............. *H04N 5/2252* (2013.01); *G03B 17/02* (2013.01); *H04N 5/23216* (2013.01); *H04N 5/23245* (2013.01)

(58) Field of Classification Search
USPC ............... 396/25–29, 535; 348/373, 374, 376
See application file for complete search history.

(56) References Cited

U.S. PATENT DOCUMENTS

| | | |
|---|---|---|
| 1,612,277 A | 12/1926 | Fitz |
| D118,296 S | 12/1939 | Tuomey |
| 3,508,482 A | 4/1970 | Taylor |
| 4,091,402 A | 5/1978 | Siegel |
| 4,208,028 A | 6/1980 | Brown et al. |
| 4,646,141 A | 2/1987 | Timmermans et al. |
| 4,733,259 A | 3/1988 | Ng |
| 5,400,234 A | 3/1995 | Yu |
| 5,808,663 A | 9/1998 | Okaya |
| D441,386 S | 5/2001 | Yamazaki |
| D442,982 S | 5/2001 | Adachi et al. |
| 6,315,180 B1 * | 11/2001 | Watkins ..................... 224/275 |
| D504,904 S | 5/2005 | Nagai et al. |

(Continued)

FOREIGN PATENT DOCUMENTS

JP           05304625 A   *  11/1993   ............. H04N 5/225

OTHER PUBLICATIONS

JP05304625A Machine Translation available from JPO website.*

(Continued)

*Primary Examiner* — Minh Phan
(74) *Attorney, Agent, or Firm* — Fenwick & West LLP

(57) ABSTRACT

A square camera housing accommodates a square camera with a substantially square profile. The square camera housing includes a latching mechanism to secure the camera in the housing, a mounting mechanism to secure the housing to a mounting device, and multiple openings in the housing body to accommodate the camera interface. These features allow the square camera to be inserted and secured in the square camera housing in one of a plurality of orientations relative to the square camera housing.

22 Claims, 10 Drawing Sheets

(56) References Cited

U.S. PATENT DOCUMENTS

| | | | |
|---|---|---|---|
| D515,121 S | 2/2006 | Bleau et al. | |
| D515,613 S | 2/2006 | Holmes et al. | |
| D551,969 S | 10/2007 | Aurilio et al. | |
| D576,486 S | 9/2008 | Koza | |
| D577,729 S | 9/2008 | Derry et al. | |
| D577,731 S | 9/2008 | Altonji et al. | |
| D596,217 S | 7/2009 | Kim et al. | |
| D616,480 S | 5/2010 | Ookawa et al. | |
| D616,742 S | 6/2010 | Lymn et al. | |
| 7,728,905 B2 * | 6/2010 | Tanaka et al. | 348/370 |
| 8,014,656 B2 | 9/2011 | Woodman | |
| 8,199,251 B2 | 6/2012 | Woodman | |
| D680,097 S | 4/2013 | Davies et al. | |
| 8,467,675 B2 | 6/2013 | Chen et al. | |
| D690,280 S | 9/2013 | Schul | |
| 8,542,308 B2 * | 9/2013 | Ozawa et al. | 348/340 |
| 8,544,643 B2 * | 10/2013 | Yim | 206/316.2 |
| D700,166 S | 2/2014 | Petersen | |
| 8,743,277 B2 * | 6/2014 | Matsuzawa et al. | 348/373 |
| 8,792,003 B2 * | 7/2014 | Nakamura | 348/148 |
| D713,868 S | 9/2014 | Yang et al. | |
| D718,617 S | 12/2014 | Taylor | |
| D727,387 S | 4/2015 | Hasegawa et al. | |
| D727,991 S | 4/2015 | Hasegawa et al. | |
| 9,004,783 B1 | 4/2015 | Woodman et al. | |
| D729,059 S | 5/2015 | Taylor | |
| D729,761 S | 5/2015 | Hu et al. | |
| D729,762 S | 5/2015 | Hu et al. | |
| D730,423 S | 5/2015 | Vandenbussche | |
| 2002/0046218 A1 | 4/2002 | Gilbert et al. | |
| 2003/0156212 A1 * | 8/2003 | Kingetsu et al. | 348/333.12 |
| 2004/0223752 A1 | 11/2004 | Ghanouni et al. | |
| 2006/0257137 A1 | 11/2006 | Fromm | |
| 2007/0140686 A1 * | 6/2007 | Misawa | 396/535 |
| 2008/0117328 A1 | 5/2008 | Daoud et al. | |
| 2008/0248703 A1 | 10/2008 | Russell | |
| 2010/0060747 A1 | 3/2010 | Woodman | |
| 2010/0061711 A1 | 3/2010 | Woodman | |
| 2011/0001834 A1 | 1/2011 | Herrell et al. | |
| 2011/0042530 A1 | 2/2011 | Phillips et al. | |
| 2011/0129210 A1 | 6/2011 | McGucken | |
| 2011/0216195 A1 | 9/2011 | Tanaka et al. | |
| 2011/0317065 A1 | 12/2011 | Lin et al. | |
| 2013/0186310 A1 | 7/2013 | Lymberis | |
| 2014/0060582 A1 * | 3/2014 | Hartranft et al. | 134/18 |
| 2015/0122849 A1 * | 5/2015 | Jones | F16M 11/02 224/181 |

OTHER PUBLICATIONS

United States Office Action for U.S. Appl. No. 14/148,536, Jul. 9, 2014, 9 pages.
PCT International Search Report and Written Opinion for PCT/US2014/070655, Apr. 29, 2015, 13 pages.
International Search Report and Written Opinion for International Application No. PCT/US2014/058465, Dec. 23, 2014, 17 pages.

* cited by examiner

CAMERA HOUSING FOR A SQUARE-PROFILE CAMERA

CROSS REFERENCE TO RELATED APPLICATIONS

This application is a continuation of U.S. application Ser. No. 14/148,536, filed Jan. 6, 2014, which is incorporated by reference in its entirety.

BACKGROUND

1. Field of Art

The disclosure generally relates to the field of cameras and in particular to a housing for a square camera.

2. Description of the Related Art

Users, such as sportspersons and outdoor enthusiasts, record high-intensity activities, such as snowboarding, surfing, biking, and stock car racing, with digital cameras. Users capture video and images of these activities on digital cameras secured within camera housings, which protect the camera, hold the camera steady in operation, and allow for hands-free operation of the camera. Furthermore, camera housings protect the camera from physical and environmental damage. Camera housings are typically affixed to another object via camera mounts during use, including bodywear (such as helmets), sporting equipment (such as surfboards), and vehicles (such as motorcycles). However, limited camera housing options make camera housings that can accommodate a wide variety of camera positions and orientations attractive to potential users. Furthermore, a camera housing that can easily secure and release a camera can beneficially improve a user's experience with the camera.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. (FIG.) 1a illustrates a perspective view of an example square camera, according to one embodiment.

DETAILED DESCRIPTION

Figure 1A:
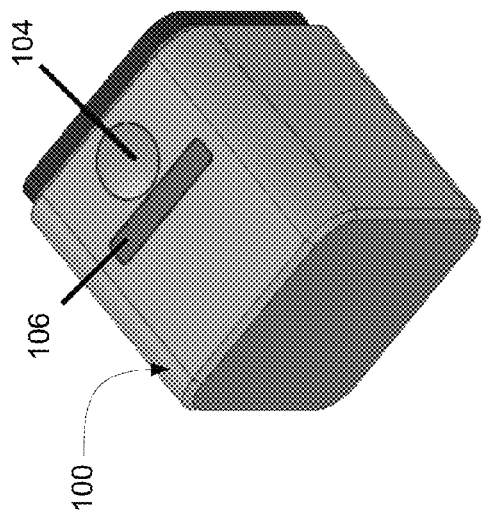
FIG. 1b illustrates an alternative perspective view of the square camera, according to one embodiment.
FIG. 1c illustrates a rear perspective view of the square camera, according to one embodiment.
FIG. 1d illustrates an alternative rear perspective view of the square camera, according to one embodiment.
FIG. 1e illustrates a front view of the square camera, according to one embodiment.
FIG. 1f illustrates a rear view of the square camera, according to one embodiment.
FIG. 1g illustrates a top view of the square camera, according to one embodiment.
Figure 1B:
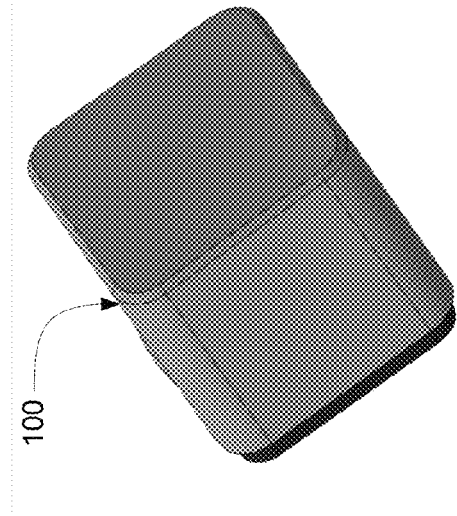
Figure 1C:
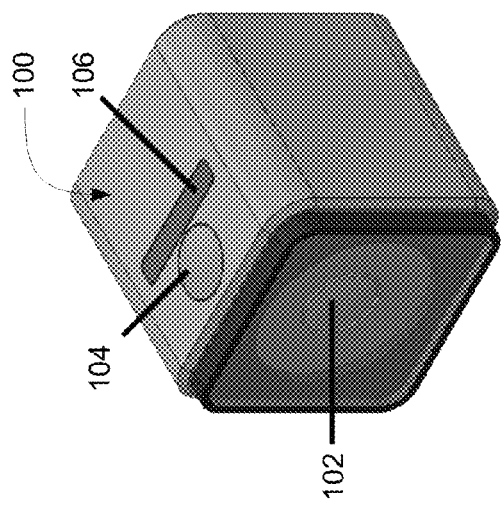
Figure 1D:
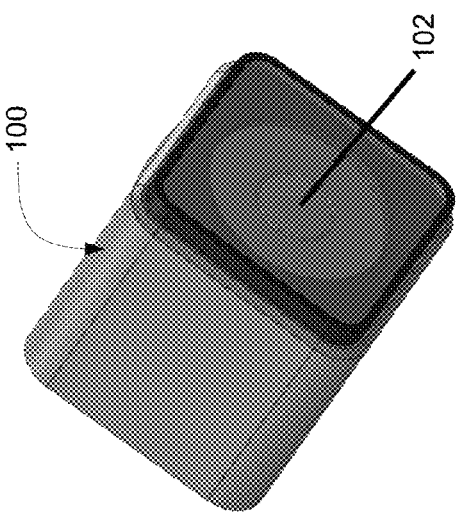

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Square Camera System Overview

FIGS. 1a to 1d illustrate perspective views of an example square camera, according to one embodiment. In these figures, the square camera 100 includes a camera lens 102, an interface button 104, and a display 106. As used herein, "square camera" refers to a camera with at least one substantially square cross-section in a two-dimensional plane. The square camera 100, which can be used with the square camera housing, includes a camera exterior that encompasses and protects the camera's internal electronics, which are further described in FIG. 2. The camera exterior includes 6 surfaces (i.e. a front face, a left face, a right face, a back face, a top face, and a bottom face), wherein the exterior surfaces form a rectangular cuboid. Furthermore, both the front and rear surfaces of the square camera 100 are substantially square in shape. In one example embodiment, all camera surfaces may also have a substantially square profile, making the square camera 100 substantially cubic. In alternate embodiments, only two of the six faces are square and the other faces may be other shapes, such as elongated rectangles. The square camera 100 can have a small form factor (e.g. a height of 2 cm to 9 cm, a width of 2 cm to 9 cm, and a depth of 2 cm to 9 cm) and is made of a rigid material such as plastic, aluminum, steel, or fiberglass. Additional camera features, such as the features described below, may be affixed to an exterior of the square camera. In some embodiments, the square camera described herein includes features other than those described below. For example, instead of a single interface button, the square camera can include additional buttons or different interface features, such as a microphone opening to receive voice or other audio commands.

Figure 1E:
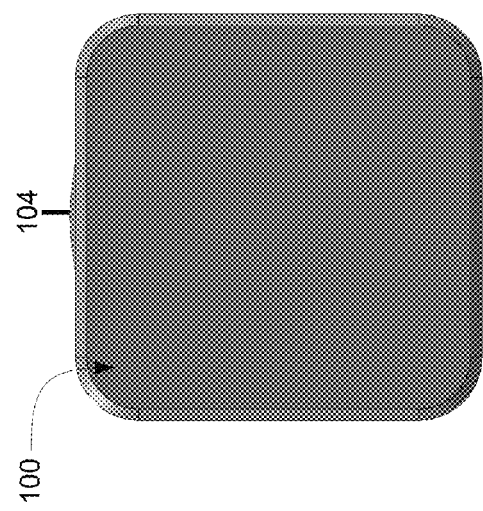

FIG. 1e illustrates a front view of the square camera, according to one embodiment. The front surface of the camera has a substantially square profile, such that all edges of the front surface are of roughly equal length. The front surface also includes a camera lens 102, which includes an aperture that allows light to pass through the lens 214 and onto an image sensor 206. The camera lens 102 can be any type of optical lens that facilitates capturing images or video, such as a wide-angle lens, an adjustable lens, a macro lens, and the like. While the camera lens 102 as shown in FIG. 1e is located in the center of the front surface, the camera lens 102 may be located anywhere on the front surface of the camera 100, or on any other surface. The camera lens 102 can protrude from the camera 100 or, as in the illustrated embodiment, can be flush with the front surface.

Figure 1F:
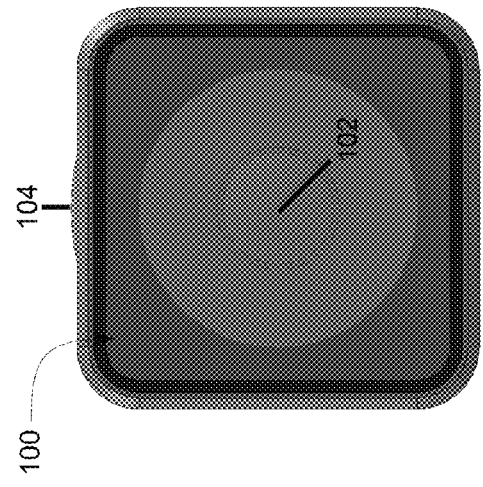

FIG. 1f illustrates a rear view of the square camera, according to one embodiment. The rear surface of the camera has a substantially square profile and has substantially similar dimensions to the front surface. While not shown in FIG. 1f, the rear surface of the square camera may further include a user interface, such as a screen, button, dial, viewfinder, or light, or a communicative interface, such as a USB or HDMI slot.

Figure 1G:
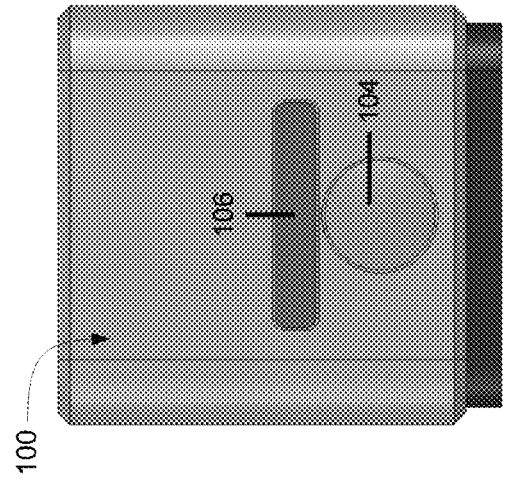

FIG. 1g illustrates a top view of the square camera, according to one embodiment. In this embodiment, the top surface has a substantially square profile with substantially similar dimensions to the front and rear surfaces; however, in other embodiments, the top surface may have a rectangular profile.

The top surface features an interface button 104 and a display 106. The interface button 104 allows a user to interact with the camera. By pressing the button, a user may take a picture or record video, power on or off the camera, save a photo, adjust the camera focus, or perform any other action relevant to recording or storing digital media. While this figure depicts the interface button 104 as a button, the interface button 104 may also be embodied as a knob, a switch, a dial, a touchscreen, a light (such as an LED), a speaker, or other forms of user interface. Furthermore, the camera may have more than one interface button 104. Even though the interface button 104 is located on the top surface of the substantially square camera, the interface button 104 may be located in any position on any surface.

The display (or screen) 106 allows the camera to output visual information to a user. In this figure, the display 106 is located on the top surface of the square camera, however, the display 106 may be located on any surface of the camera 100.

Figure 2:
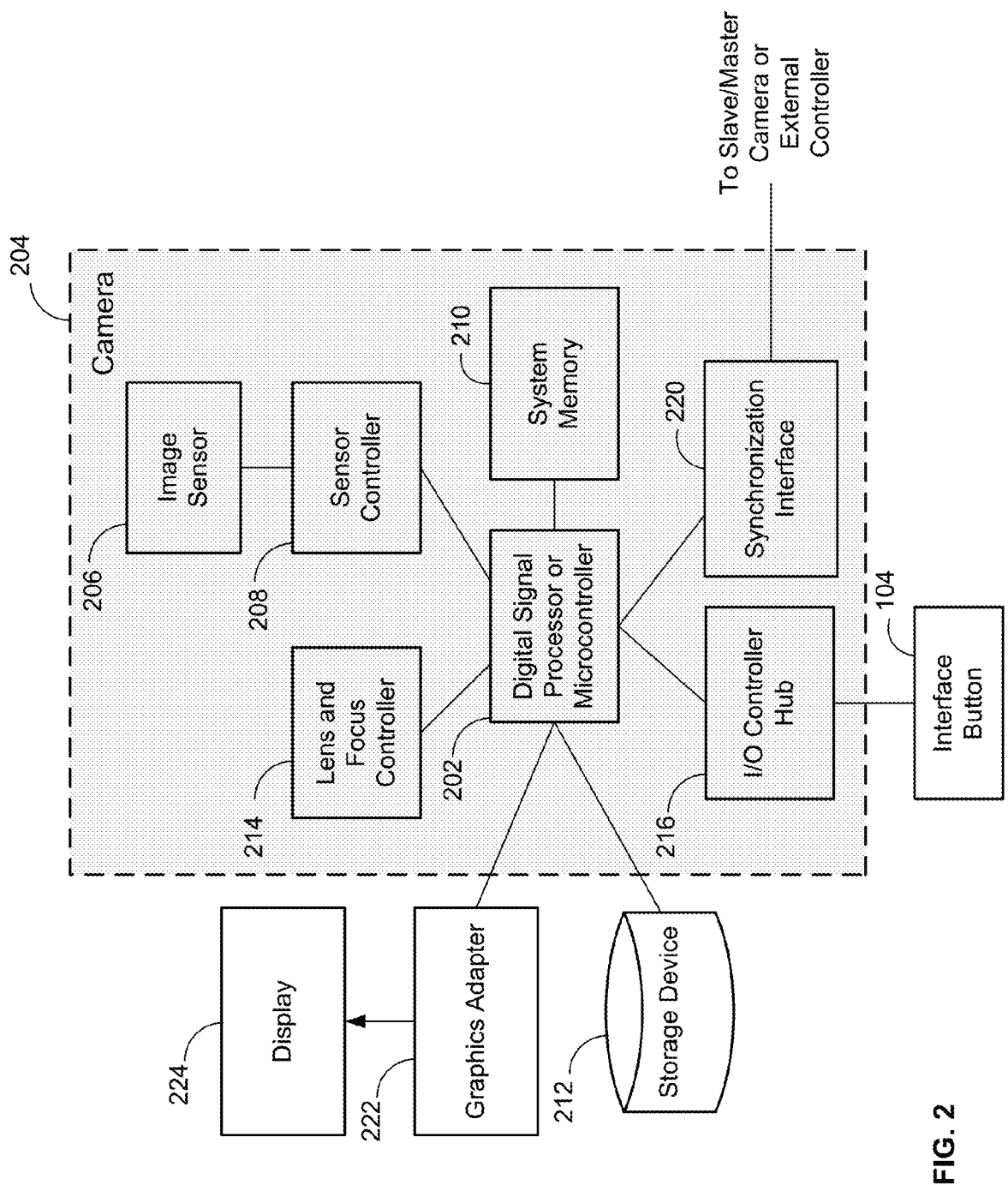
FIG. 2 illustrates a block diagram of the square camera's internal electronics, according to one embodiment.

FIG. 2 is a block diagram illustrating one embodiment of electronic components of a square camera 100. The square camera 100 includes one or more processors 202 (generally, such as a digital signal processor or a microcontroller) that controls the operation and functionality of the camera. The processor 202 controls the operation of a lens and focus controller 204, an image sensor (or image sensor array) 206, a sensor controller 208, a system memory 210, an I/O controller hub 216, and a synchronization interface 220. In some embodiments, the camera 204 includes components other than those illustrated herein.

The image sensor 206 is configured to capture light incident upon the image sensor to produce image data based on control signals from the sensor controller 208. The lens and focus controller 214 is configured to control the operation and configuration of a camera lens. The system memory 210 is configured to store executable computer instructions that, when executed by the processor 202, perform the camera functionalities described herein. The camera 204 sends information (such as captured images and video) to and from the interface button 104 via the I/O controller hub. The processor 202 can store captured images and video in an external storage device 212, or can output captured images or video for display on an external display 224 via a graphics adapter 222. The synchronization interface 220 is configured to synchronize the camera 204 with other cameras or with other external devices, such as a remote control or a smart phone.

Square Camera Housing System Overview

FIG. 3a to FIG. 3d illustrate perspective views of an example narrow-frame square camera housing, according to one embodiment. As used herein, "square camera housing" refers to a camera housing with at least one substantially square cross-section The square camera housing includes a housing body 300, a mounting mechanism 302, a latching mechanism 304, and a plurality of openings 306 configured to accommodate the interface button 104.

The housing body 300 is a structure that secures the square camera 100. The housing body 300 includes four walls or more (i.e., a top wall, a bottom wall, a left wall, and a right wall) that create a band around the square camera 100. Alternatively, the housing body 300 may be missing one or more of these walls (such as the top wall or a side wall) such that the housing body 300 is in the form of a U-shape instead of a band. In one example, the walls of the housing body 300 do not fully encompass various surfaces of the square camera 100 (such as the top surface, right surface, and left surface of the camera). In another example, the walls of the housing body 300 fully encompass one or more surfaces of the square camera 100. While the illustrated housing body 300 only includes four walls, other embodiments of the housing body feature additional walls. For example, a housing body 300 may include a front wall or a rear wall to further secure the camera in the housing body. In another example, the housing body may include additional walls that form a hexagonal or octagonal housing to accommodate a similarly-shaped camera 100. Additional features of the housing body 300 may include a housing lip, located along one or more interior edges of the body, to limit the depth to which the camera can be inserted into the housing body 300. For example, a housing lip along the perimeter of the housing body's front face prevents the square camera 100 from being pushed out of the housing body 300 when the camera 100 is inserted from the rear.

The interior dimensions of the housing body 300 are similar to the exterior dimensions of the square camera frame, such that the square camera fits flush into the housing body. Furthermore, the housing body 300 in one example embodiment can have a small form factor (e.g. a height of 2 cm. to 10 cm., a width of 2 cm. to 10 cm., and a depth of 2 cm. to 10 cm.) and is lightweight (e.g. a weight of 25 to 150 grams).

The latching mechanism 304 can be configured in a open position such that the square camera can be inserted or removed from the housing body 300, or can be configured to a closed position such that the square camera can be compressibly secured within the housing body. The housing body 300 can be made of a flexible material (e.g. plastic, polymer, metal, wood, or any other suitable material) that allows the walls to sufficiently deflect when the latching mechanism 304 is configured in an open position, allowing for the insertion or removal of the square camera from the housing body. Furthermore, the flexible material may exhibit material properties suitable for protecting the square camera 100 secured in the square camera housing from physical shock, abrasion, vibration, or environmental damage (e.g. water damage, dust, etc.). The latching mechanism 304 can be made of plastic, polymer, metal, wood, or any other suitable material.

It should be noted that while the description of the housing body 300 includes a description of separate walls, this does not necessarily imply that the housing body includes separate wall components welded, fastened, or otherwise connected. In one embodiment, the housing body 300 is fabricated as a single piece with no discernible boundaries between walls.

FIG. 3e to FIG. 3j illustrate views of the narrow-frame square camera housing, according to one embodiment. The figures illustrate features connected to the housing body 300, including a plurality of protrusions 302, a latching mechanism 304, and a plurality of openings 306 to accommodate the camera interface button 104.

Figure 3A:
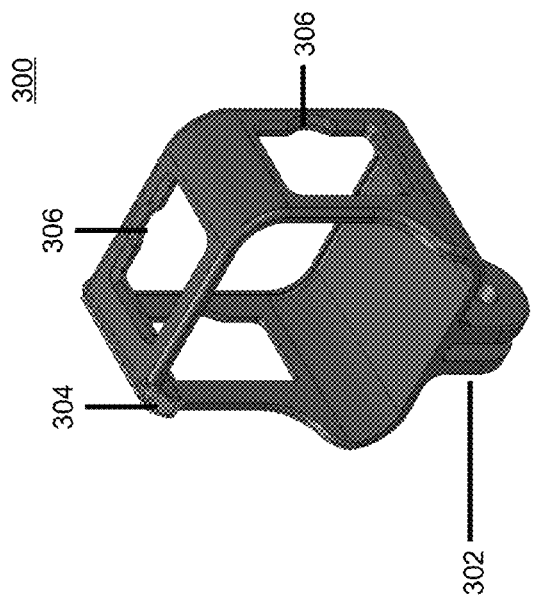
FIG. 3a illustrates a perspective view of a narrow-frame square camera housing, according to one embodiment.
Figure 3B:
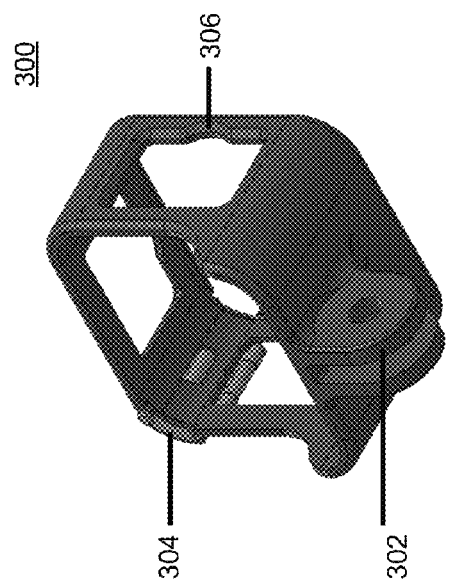
FIG. 3b illustrates an alternative perspective view of the narrow-frame square camera housing, according to one embodiment.
Figure 3C:
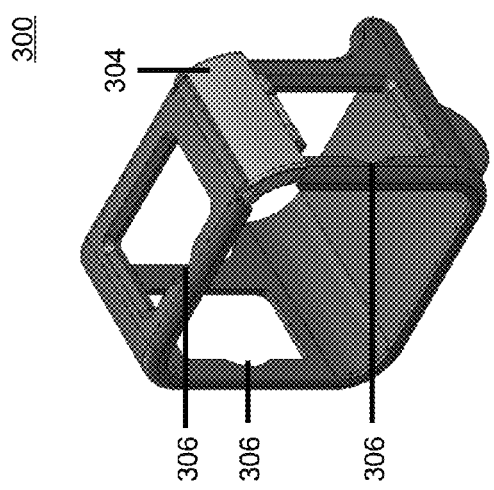
FIG. 3c illustrates a rear perspective view of the narrow-frame square camera housing, according to one embodiment.
Figure 3D:
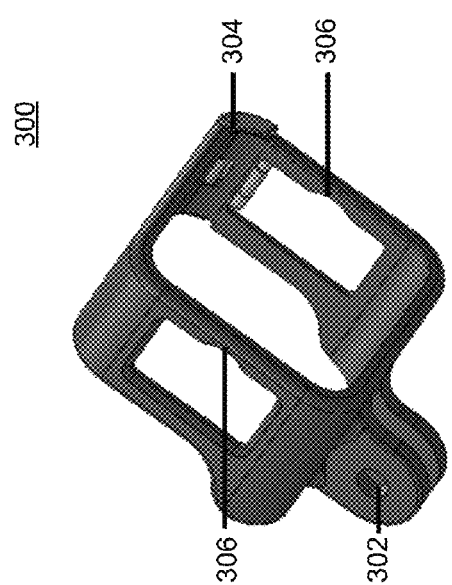
FIG. 3d illustrates an alternative rear perspective view of the narrow-frame square camera housing, according to one embodiment.
Figure 3E:
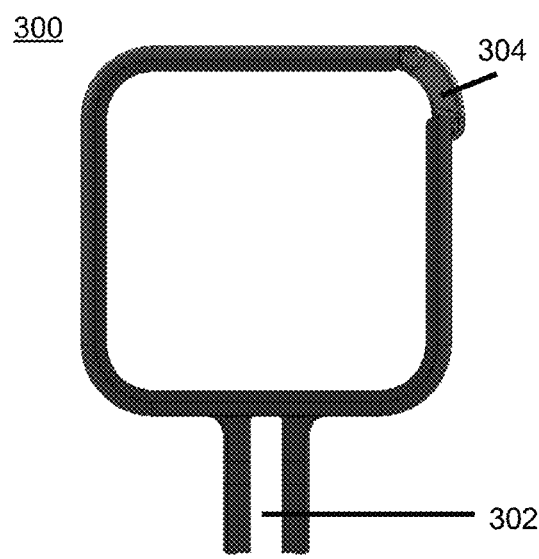
FIG. 3e illustrates a front view of the narrow-frame square camera housing, according to one embodiment.
Figure 3F:
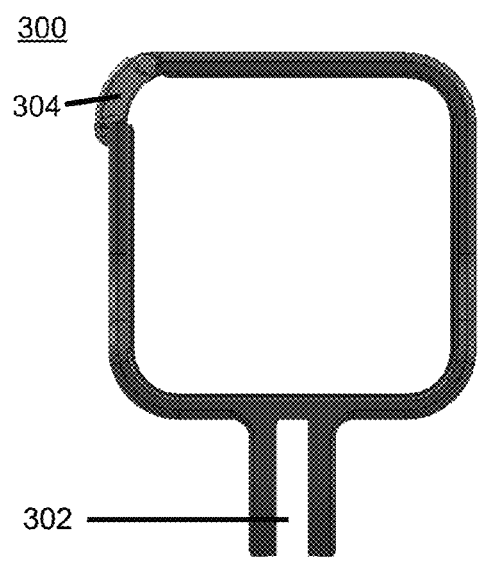
FIG. 3f illustrates a rear view of the narrow-frame square camera housing, according to one embodiment.
Figure 3G:
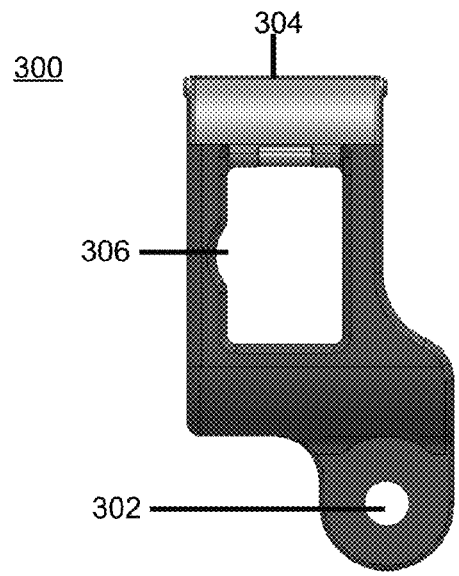
FIG. 3g illustrates a side view of the narrow-frame square camera housing, according to one embodiment.
Figure 3H:
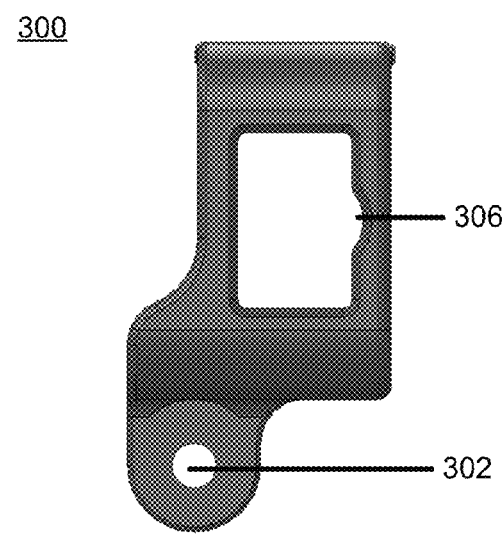
FIG. 3h illustrates an alternative side view of the narrow-frame square camera housing, according to one embodiment.
Figure 3I:
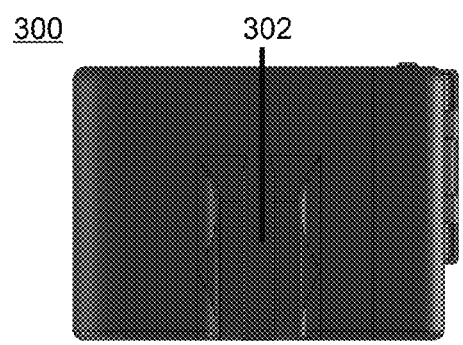
FIG. 3i illustrates a bottom view of the narrow-frame square camera housing, according to one embodiment.
Figure 3J:
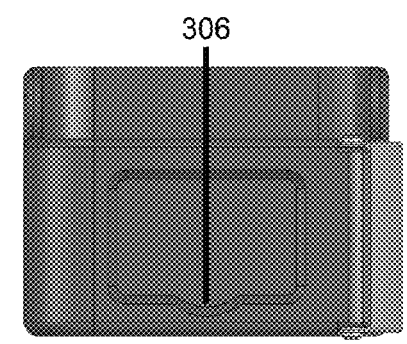
FIG. 3j illustrates a top view of the narrow-frame square camera housing, according to one embodiment.
Figure 3M:
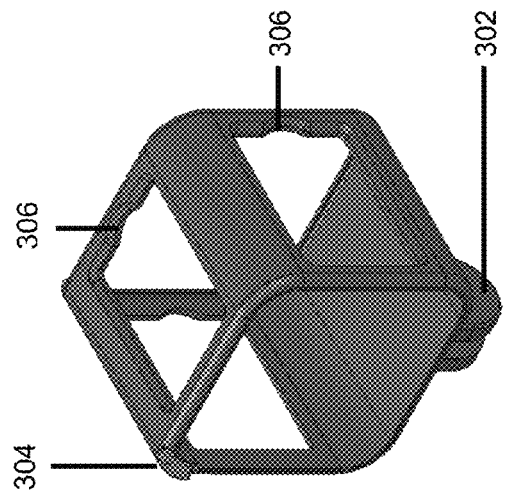
FIG. 3m illustrates a rear perspective view of the wide-frame square camera housing, according to one embodiment.
Figure 3N:
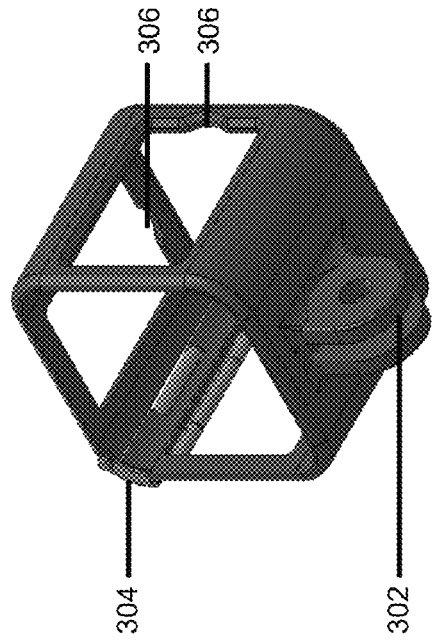
FIG. 3n illustrates an alternative rear perspective view of the wide-frame square camera housing, according to one embodiment.
Figure 3K:
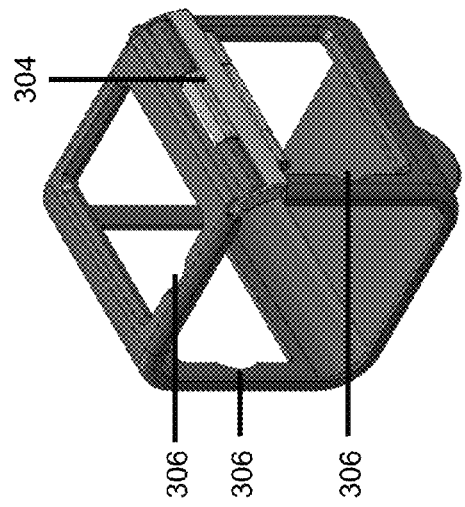
FIG. 3k illustrates a perspective view of a wide-frame square camera housing, according to one embodiment.
Figure 3L:
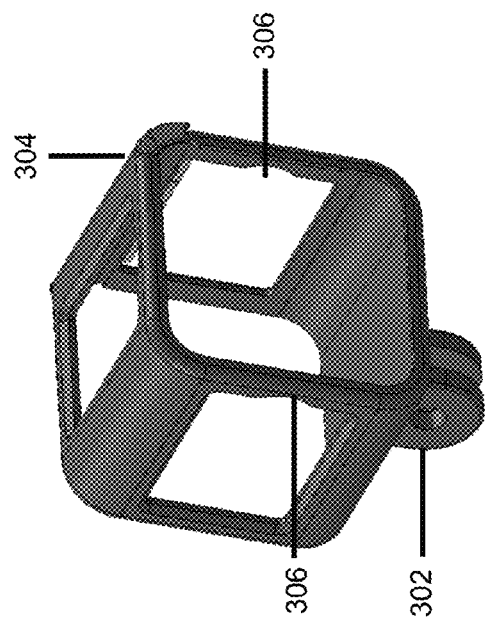
FIG. 3l illustrates an alternative perspective view of the wide-frame square camera housing, according to one embodiment.
Figure 3O:
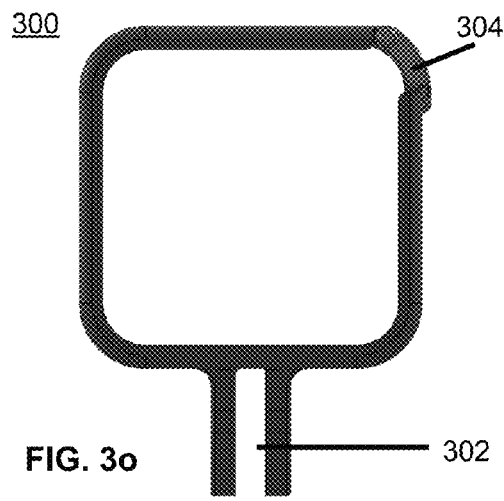
FIG. 3o illustrates a front view of the wide-frame square camera housing, according to one embodiment.
Figure 3P:
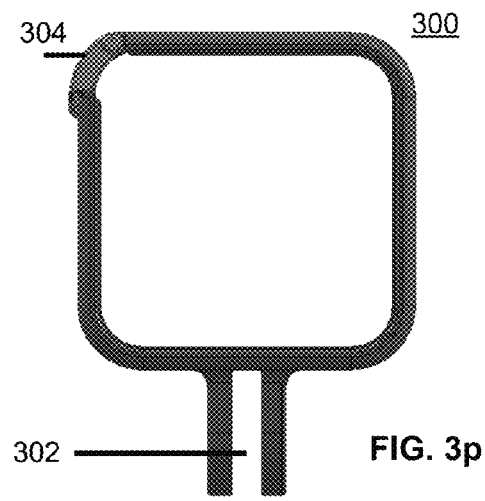
FIG. 3p illustrates a rear view of the wide-frame square camera housing, according to one embodiment.
Figure 3Q:
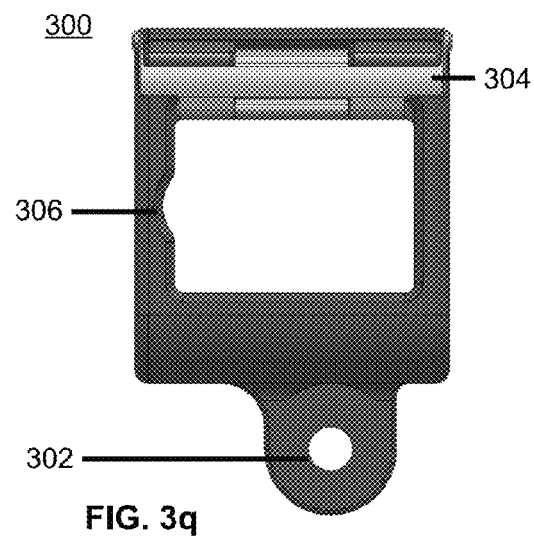
FIG. 3q illustrates a side view of the wide-frame square camera housing, according to one embodiment.
Figure 3R:
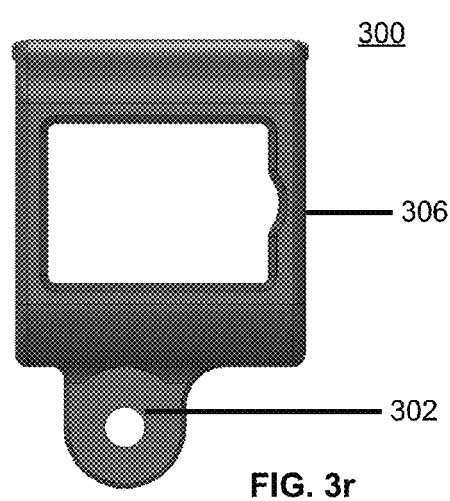
FIG. 3r illustrates an alternative side view of the wide-frame square camera housing, according to one embodiment.
Figure 3S:
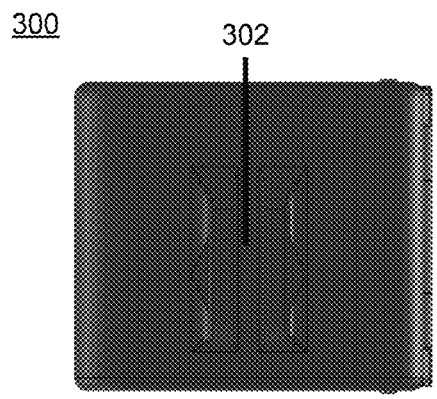
FIG. 3s illustrates a bottom view of the wide-frame square camera housing, according to one embodiment.
Figure 3T:
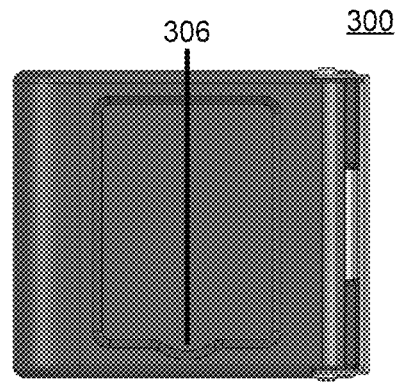
FIG. 3t illustrates a top view of the wide-frame square camera housing, according to one embodiment.

A mounting mechanism allows the housing body 300 to be coupled to another object, such as bodywear, sporting equipment, or a vehicle. The mounting mechanism includes two protrusions 302 on the bottom surface of the housing body 300. As seen in FIG. 3g and FIG. 3h, each protrusion 302 includes an aligning screw hole. The protrusions 302 are spaced such that the mounting mechanism can be coupled to a reciprocal mounting mechanism including additional protrusions that interlock with the protrusions 302. The additional protrusions can also include screw holes that align with the screw holes of the protrusions 302 such that a screw (e.g., a turnable handscrew) may be inserted through the interlocking protrusions, coupling the housing body 300 to the reciprocal mounting mechanism. When the turnable handscrew is in an unlocked position, the housing body 300 can pivot rotationally relative to the reciprocal mounting device. When the turnable handscrew is in a locked position, the housing body 300 is fixed in position relative to the reciprocal mounting device.

The plurality of openings 306 are openings in the walls of the housing frame 300 that allow the square camera 100 to be oriented in multiple positions relative to the square camera housing such that the interface button 104 is accessible to a user through one of the openings 306. In FIG. 3g and FIG. 3h, the plurality of openings are each rectangular in shape and include a semi-elliptical cutout that accommodates the interface button 104. However, other embodiments of the plurality of openings 306 may be any shape that accommodates one or more camera interfaces. The plurality of openings are located in the same relative position on each surface of the housing body 300 (e.g., on the top surface, the left surface, and the right surface) such that the camera body can be inserted and secured in the body in one of a plurality of orientations. For example, the plurality of openings 306 may allow the square camera 100 to be oriented in the frame vertically upright, rotated 90 degrees clockwise from vertical, or rotated 90 degrees counterclockwise from vertical. In other embodiments, the plurality of openings may be arranged such that the square camera 100 may be oriented in additional or alternative positions. Furthermore, a pliable waterproof or water-resistant material may be placed over the plurality of openings 306 to protect the camera from water or dust but not impede access to the interface button 104.

In one embodiment, the square camera 100 is configured to identify an orientation of the camera within the housing body 300. In such an embodiment, the square camera 100 can adjust the portion of the image sensor used to capture an image based on the identified orientation. For instance, if the square camera is inserted into the camera housing in an upright configuration, the square camera can capture an image from light incident upon a 16:9 ratio portion of the image sensor (and accordingly, can disregard light incident upon other portions of the image sensor, or can maintain image data from light incident upon such portions for use in subsequent image processing). Similarly, if the square camera is inserted into the camera housing in a 90 degrees clockwise from vertical orientation, the square camera can capture an image from light incident upon a 9:16 ratio portion of the image sensor, for instance for use in subsequent image processing to produce a 16:9 image. In these embodiments, the square camera 100 can include a square image sensor, and can be configured to adjust the portion of the image sensor used to capture an image.

In another example embodiment, the housing body 300 may not include a plurality of openings 306. Instead, the housing body 300 may include one or more button interfaces that allow for user interaction with the square camera 100. For example, the top wall, left wall, and right wall of the housing can each include one or more buttons or other compressible components configured to align with a camera interface when the camera is inserted into the camera housing in an associated orientation and to allow a user of the housing to interact with the camera interface using the compressible housing components.

FIG. 3k to FIG. 3t illustrate an embodiment of a wide-frame square camera housing. The wide-frame square camera housing has the same functionality as the narrow-frame square camera housing described in FIG. 3a to FIG. 3j. However, the wide-frame square camera housing includes walls that completely encompass the top, bottom, and side surfaces of the square camera 100. Each wall of the wide-frame camera housing encompasses each corresponding side of the square camera 100. Like the surfaces of the square camera 100, the walls of the wide-frame housing body 300 are substantially square in shape. The interior dimensions of the housing body 300 are similar to the exterior dimensions of the square camera frame, such that the square camera fits flush within the housing body. Furthermore, the housing body 300 in one example embodiment has a small form factor (e.g., a height of 2 cm. to 10 cm., a width of 2 cm. to 10 cm., and a depth of 2 cm. to 10 cm.) and is lightweight (e.g., a weight of 25 to 150 grams).

Figure 4:
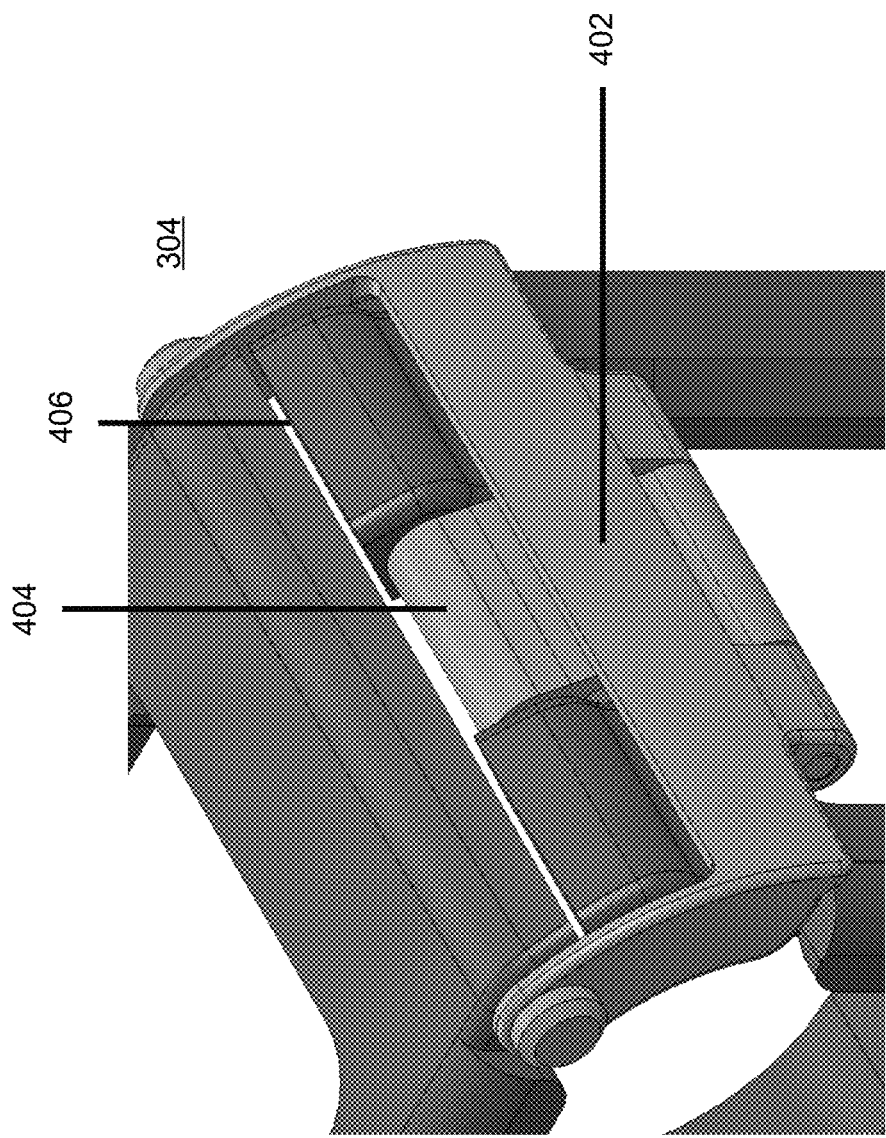
FIG. 4 illustrates a latching mechanism for a square camera housing, according to one embodiment.

FIG. 4 illustrates a latching mechanism 304 for a square camera housing, according to one embodiment. The latching mechanism 304 includes a first hinge mechanism 402 coupled to a top wall of the housing body 300 and a second hinge mechanism 404 coupled to a side wall of the housing body. However, the latching mechanism 304 may be located on any surface of the housing body (for instance, the latching mechanism 304 can be located exclusively on the top wall, a side wall, or the bottom wall, or can be located at the intersection of a side wall and the bottom wall). The first 402 and the second 404 hinge mechanisms interlock such that when the latching mechanism 304 is configured in an open position, a gap 406 between the top wall and the side wall of the housing body 300 increases (or expands), increasing the inside perimeter of the housing body 300 and allowing for the insertion and removal of the square camera 100 from the housing body 300. When the first 402 and the second 404 hinge mechanisms are in a closed position, the gap 406 decreases (or shrinks), decreasing the inside perimeter of the housing body 300 and securing the squares camera 100 within the housing body 300. The exteriors of both hinge mechanisms can be smooth and featureless, such that the latching mechanism does not catch on other objects or the surrounding environment. The latching mechanism 304 can be unlocked by lifting the first hinge mechanism 402.

In another example embodiment, the camera housing does not require a latching mechanism. In this embodiment, the camera housing includes a flexible/stretchable compressive band configured to compressibly secure a camera is within the housing. In such an embodiment, to insert a camera, the housing can be stretchably expanded to accommodate the insertion of the camera, and released to compressibly wrap around the exterior of the camera, securing the camera within the housing.

Figure 5C:
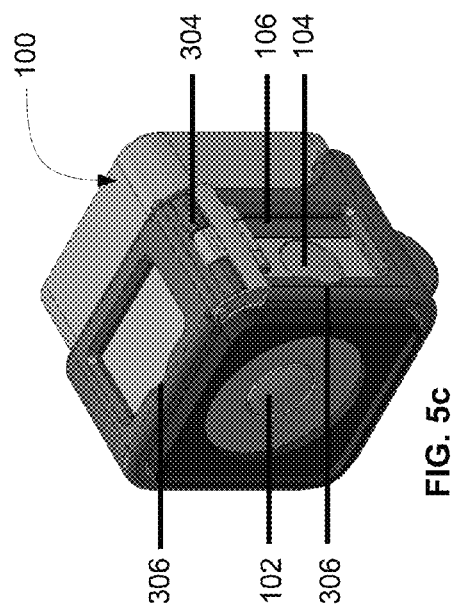
FIG. 5c illustrates the camera inserted into the narrow-frame square camera housing in a second configuration, according to one embodiment.
Figure 5B:
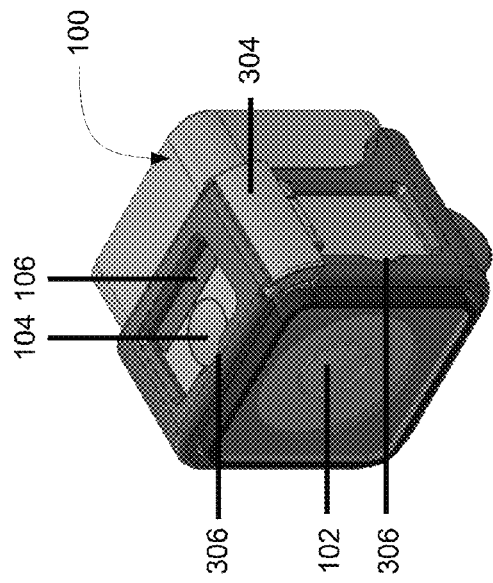
FIG. 5b illustrates the camera inserted into the narrow-frame square camera housing in a first configuration, according to one embodiment.
Figure 5A:
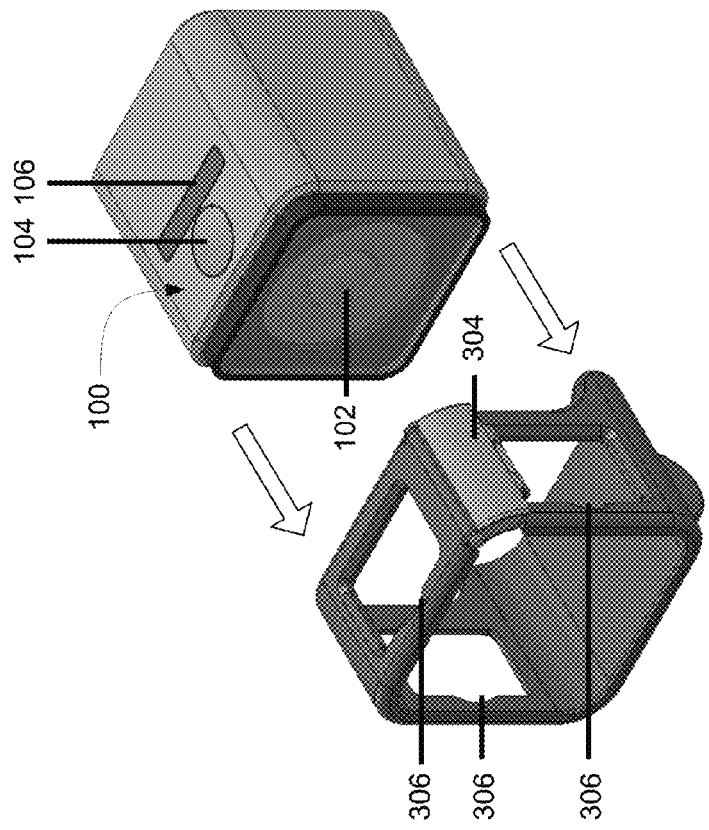
FIG. 5a illustrates the insertion of the square camera into the narrow-frame square camera housing, according to one embodiment.

FIG. 5a illustrates the insertion of the square camera into the narrow-frame square camera housing, according to one embodiment. To insert the square camera 100 into the square camera housing, the latching mechanism 304 is unlocked and the square camera 100 is inserted into the housing body 300 in one of a plurality of orientations relative to the housing body 300. The square camera 100 may be inserted into the square camera housing through the front opening of the housing or the rear opening of the housing. A housing lip on one or more wall interiors, e.g., along an edge of each wall, may regulate the position of the square camera 100 within the housing. While the camera lens 102 is facing front in the exemplary orientations, the camera may be inserted such that the lens is facing the rear surface of the housing body 300. Furthermore, other embodiments of the square camera housing may accommodate the square camera 100 in additional or alternative orientations. Once the camera 100 is fully inserted into the housing body 300, the latching mechanism 304 is closed. The housing body 300 may be connected to a reciprocal mounting device either before or after the camera is inserted into the body.

FIG. 5b illustrates the camera inserted into the narrow-frame square camera housing in a first configuration, according to one embodiment. In the exemplary square camera housing embodied in FIG. 5b, the square camera 100 is inserted vertically upright into the square camera housing.

FIG. 5c illustrates the camera inserted into the narrow-frame square camera housing in a second configuration, according to one embodiment. The second configuration may include rotating the square camera 100 90 degrees clockwise or 90 degrees counterclockwise around the front-rear axis. However, the square camera 100 may be inserted into the square housing body 300 in other configurations not disclosed in FIG. 5c.

Figure 5E:
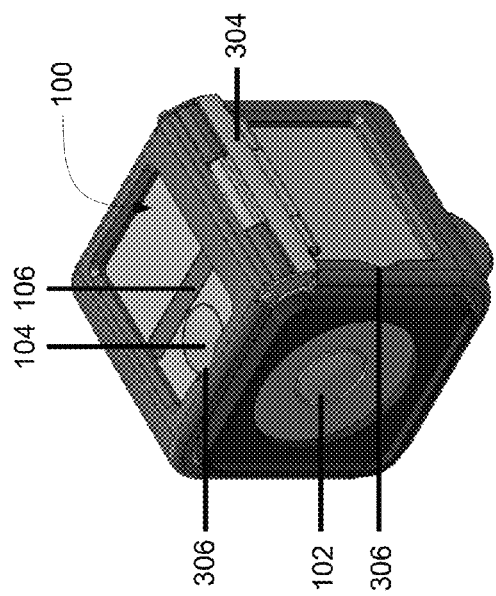
FIG. 5e illustrates the camera inserted into the wide-frame square camera housing in a first configuration, according to one embodiment.
Figure 5F:
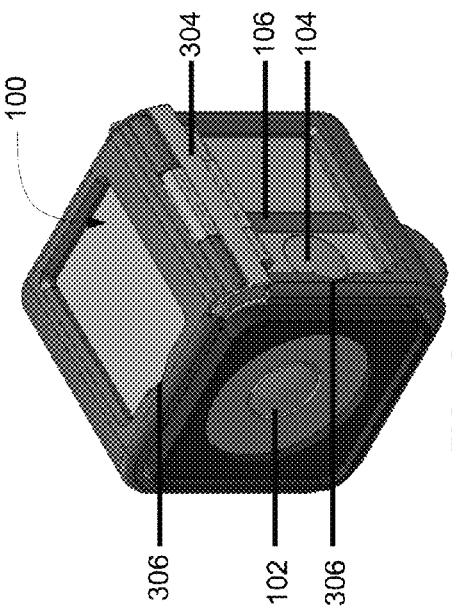
FIG. 5f illustrates the camera inserted into the wide-frame square camera housing in a second configuration, according to one embodiment.
Figure 5D:
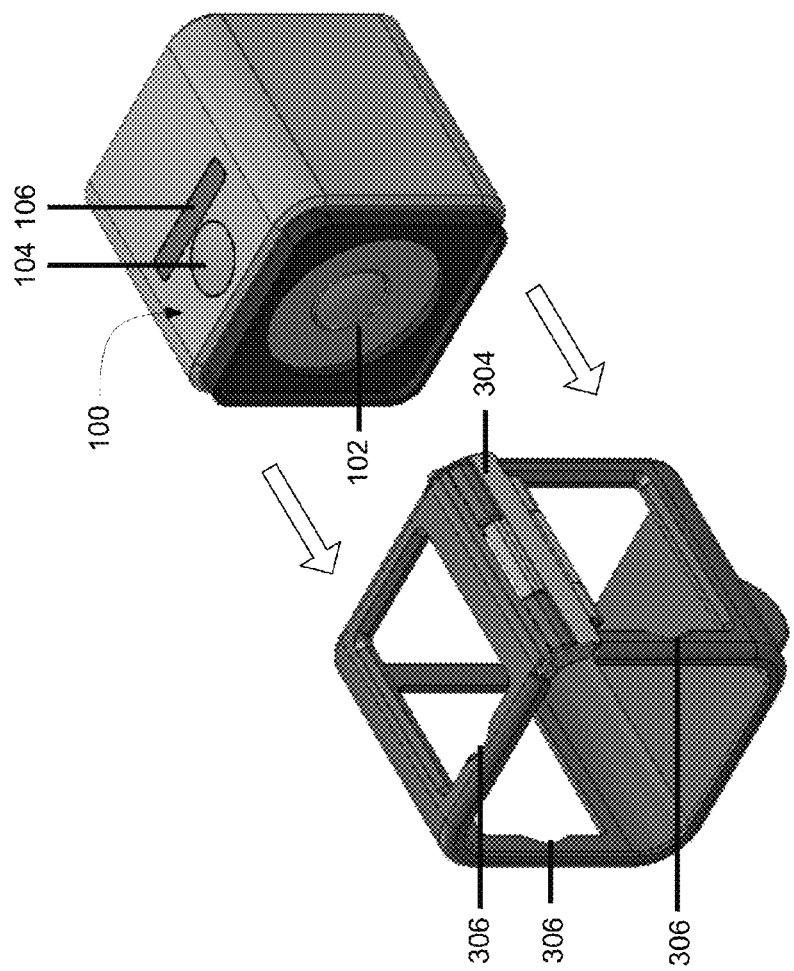
FIG. 5d illustrates the insertion of the square camera into the wide-frame square camera housing, according to one embodiment.

FIG. 5b and FIG. 5c illustrate the square camera 100 secured in different orientations within the narrow-frame square camera mount. FIG. 5b shows the square camera 100 secured vertically upright in the square camera mount, while FIG. 5c shows the camera secured while rotated 90 degrees clockwise in the camera mount. Similarly, FIG. 5d-FIG. 5f illustrate the square camera 100 being inserted and secured in the wide-frame square camera mount.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other, or are structured to provide a thermal conduction path between the elements.

Likewise, as used herein, the terms "includes," "comprising," "includes," "including," "has," "having," or any other variation thereof, are intended to cover a non-exclusive inclusion. For example, a process, method, article, or apparatus that includes a list of elements is not necessarily limited to only these elements but may also include other elements not expressly listed to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera or camera housing as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation, and details of the method and apparatus disclosed herein without departing from the spirit and scope defined in the appended claims.

What is claimed is:

1. A camera comprising:
    a front face, the front face comprising a camera lens substantially centered on the front face, the camera lens protruding from the front face of the camera, the front face comprising a square with rounded corners cross-section;

a rear face, the rear face comprising a Universal Serial Bus ("USB") interface, the rear face comprising a square with rounded corners cross-section;

a top face, the top face comprising an interface button configured to allow a user of the camera to interact with the camera, the top face comprising a substantially square cross-section;

a bottom face comprising a substantially square cross-section;

a left face comprising a substantially square cross-section;

a right face comprising a substantially square cross-section; and a camera housing, the camera housing comprising a square with rounded corners cross-section in at least one dimension and configured to at least partially abut each of the top face, the bottom face, the left face, the right face, the front face, and the rear face, the camera housing comprising an opening within a front side or a rear side of the camera housing.

2. A camera comprising:

a substantially square front face, the front face comprising a camera lens;

a substantially square rear face opposite the front face;

a substantially square top face;

a substantially square bottom face opposite the top face;

a substantially square left face;

a substantially square right face opposite the left face; and a camera housing, the camera housing comprising a substantially square cross-section in at least one dimension and configured to at least partially abut each of the top face, the bottom face, the left face, the right face, the front face, and the rear face, the camera housing comprising an opening within a front side or a rear side of the camera housing.

3. The camera of claim 2, wherein the camera lens is centered on the front face of the camera.

4. The camera of claim 2, wherein the camera lens protrudes from the front face of the camera.

5. The camera of claim 2, wherein the camera lens is flush with the front face of the camera.

6. The camera of claim 2, wherein the camera lens comprises one of: a wide-angle lens, an adjustable lens, and a macro lens.

7. The camera of claim 2, wherein each of the front face and the rear face have rounded corners.

8. The camera of claim 2, wherein the rear face of the camera includes a communicative interface.

9. The camera of claim 8, wherein the communicative interface comprises a Universal Serial Bus ("USB") interface.

10. The camera of claim 2, wherein the top face of the camera includes an interface button.

11. The camera of claim 10, wherein the interface button is configured to capture an image or video when pressed.

12. The camera of claim 10, wherein the interface button is configured to power on or power off the camera when pressed.

13. The camera of claim 10, wherein the interface button is configured to configure an operating mode of the camera when pressed.

14. The camera of claim 2, wherein the camera is waterproof.

15. The camera of claim 2, wherein the camera housing comprises a latch mechanism configured to secure the camera in a first configuration and to open the camera housing in a second configuration.

16. The camera of claim 2, wherein the camera housing comprises an interface that aligns with an interface button of the camera when the camera is secured within the camera housing.

17. The camera of claim 2, wherein the camera is configured to couple to removably couple to a mounting mechanism.

18. The camera of claim 17, wherein the mounting mechanism is configured to couple to one or more of: bodywear, sports equipment, and a vehicle.

19. A camera comprising:

a camera body, the camera body comprising a square cross-section in each of three dimensions, the camera body further comprising rounded corners on each of two or more faces;

a lens, the lens centered on a first face of the camera body and protruding from the surface of the camera body;

an interface button located on a second face of the camera body and configured to allow a user to operate the camera when pressed;

a communicative interface located on a third face of the camera body; and a housing comprising a substantially square cross-section in at least one dimension and configured to at least partially abut each of six faces of the camera body when the camera body is secured within the housing, the camera housing comprising an opening within a front side or a rear side of the camera housing.

20. The camera of claim 19, wherein the square cross-section for at least one dimension comprises a square with rounded corners.

21. The camera of claim 19, wherein the square cross-section for at least one dimension comprises a square with right angle corners.

22. The camera of claim 19, wherein the square cross-section for at least one dimension comprises a square with angled corners.

* * * * *